United States Patent [19]
Hempel et al.

[11] Patent Number: 4,846,208
[45] Date of Patent: Jul. 11, 1989

[54] CLOSING ARRANGEMENT FOR A VENT LINE OF A FUEL TANK

[75] Inventors: Ulrich Hempel, Renningen; Josef Osterle, Rammingen, both of Fed. Rep. of Germany

[73] Assignee: Dr. Ing. h.c.F. Porsche Aktiengesellschaft, Stuttgart, Fed. Rep. of Germany

[21] Appl. No.: 174,221

[22] Filed: Mar. 28, 1988

[30] Foreign Application Priority Data

Mar. 26, 1987 [DE] Fed. Rep. of Germany ....... 3709925

[51] Int. Cl.⁴ ............................................. F16K 17/36
[52] U.S. Cl. .................................................. 137/43
[58] Field of Search .......................... 137/38, 39, 43, 45

[56] References Cited

U.S. PATENT DOCUMENTS 2,065,783 12/1936 Woodbridge ..................... 137/43 X
2,355,288 8/1944 Fritzinger .......................... 137/43 X
4,050,471 9/1977 Anhegger .......................... 137/43 X

FOREIGN PATENT DOCUMENTS 1004877 3/1957 Fed. Rep. of Germany ........ 137/43
2503731 7/1980 Fed. Rep. of Germany .

Primary Examiner—Robert G. Nilson
Attorney, Agent, or Firm—Barnes & Thornburg

[57] ABSTRACT

A closing arrangement for a vent line of a fuel tank includes a housing with an inlet and an outlet as well as a closing device which is actuated as a function of the position of the vehicle. The closing device includes a mass part and a closing part, the latter closing a connecting opening in the housing when the vehicle is in an inclined position. In order to provide a closing arrangement that functions well even in the case of an intensified gasification of the fuel, two chambers located above one another are provided inside the housing and are connected with one another via the connecting opening, in which case the mass part is arranged in one chamber and the closing part is arranged in the other chamber, and a connecting element extends between the mass part and the closing part that penetrates the outlet opening and, in sections, projects into both chambers.

17 Claims, 3 Drawing Sheets

CLOSING ARRANGEMENT FOR A VENT LINE OF A FUEL TANK

BACKGROUND AND SUMMARY OF THE INVENTION

The invention relates to a closing arrangement for a vent line of a fuel tank that comprises a housing with an inlet and an outlet as well as a closing device and is actuated as a function of the Position of the vehicle, the closing device consisting of a mass part and a closing part interacting with the mass part, and the closing part closing off an outlet opening in the case of an inclined position of the vehicle.

In a known closing arrangement of the initially mentioned type described in German patent (DE-PS) No. 25 03 731, a conical chamber is provided inside the housing that expands in upward direction and in which a mass part is arranged and a closing part that is located on the upper surface of the mass part. In the case of an inclined or inverted position of the vehicle, the mass part slides along a guiding wall of the housing and presses the closing part into the outlet opening, whereby no more fuel can flow out through the outlet opening.

In practice, it was found that under extreme conditions, for example, (high outside temperatures and/or high altitudes), in the driving operation, an increased gasification of the fuel occurs, resulting in an increased flow of gas from the fuel tank into the vent line and the closing arrangement. As a result of this flow of gas and possibly as a result of shocks during the driving operation, the closing part may be pressed upward against the outlet opening and closes this outlet opening, which results in a pressure increase within the closing arrangement and in the fuel tank system. The pressure increase has the effect that the closing part, even in the normal position of the vehicle, is caught in the outlet opening, so that a perfect venting of the fuel tank will no longer exist.

It is an object of the invention to provide a closing arrangement that functions well even in the case of an increased gasification of the fuel.

According to the invention, this objective is achieved by providing a two chamber housing in the vent line with a mass part in one chamber and a closing element in the other chamber connected to one another by a connecting rod such that the mass part maintains the closing element in an open position unless the vehicle is tilted.

The main advantages achieved by means of the invention are that, as a result of the development of the housing and of the closing device, a closing arrangement is provided that functions perfectly in the case of high outside temperatures as well as at high altitudes and in all positions of the vehicle. By arranging the mass part, that interacts with the closing part via a connecting element, on top, it is achieved that the closing element, even in the case of a high gasification of the fuel, is not pressed upward against the connecting outlet opening between the two chambers.

In its preferred embodiments the guiding ribs that are arranged at the upper chamber receive the mass part that, to a certain extent, is freely movable, in which case flow-through ducts extend between the guiding ribs through which the fuel vapors can pass when the outlet opening is open. The star-shaped ribs that are provided at the lower chamber provide that the sealing surface disposed in front of the outlet opening is not damaged by the connecting element between the closing part and the mass part. When the vehicle is in an inclined or inverted position, the mass part slides along the guiding ribs and pulls the closing part against the outlet opening.

Other objects, advantages and novel features of the present invention will become apparent from the following detailed description of the invention when considered in conjunction with the accompanying drawings.

DETAILED DESCRIPTION OF THE DRAWINGS

Figure 1:
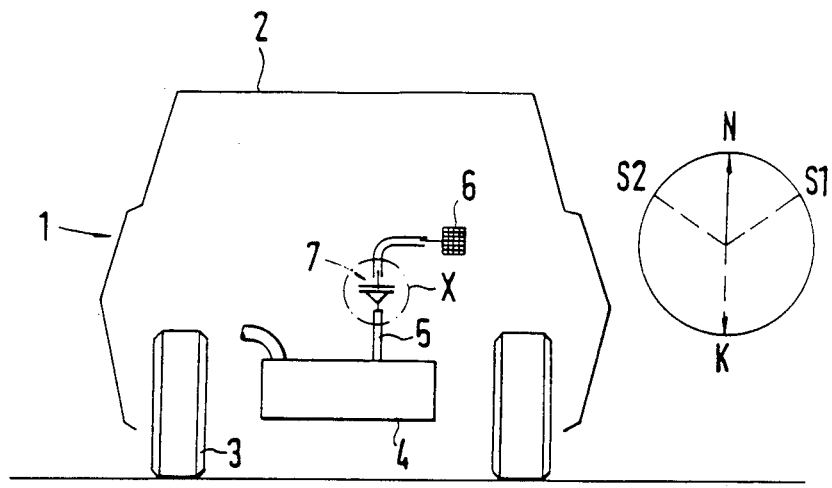
FIG. 1 is a diagrammatic representation of a motor vehicle containing a fuel tank vent line closing arrangement constructed in accordance with a preferred embodiment of the invention.

The motor vehicle 1 comprises a body 2 that is carried by wheels 3. On the inside of the body 2, a fuel tank 4 is Provided that has a vent line 5 for the venting of the fuel tank 4. An activated-carbon filter 6 is connected to the outlet side of the vent pipe 5 and prevents an emission of environmentally harmful fuel vapors into the atmosphere.

In addition, the vent line 5, outside the fuel tank 4, has a closing arrangement 7 that ensures that, in the case of a normal position N of the motor vehicle 1, the fuel tank 4 is vented, and that in the case of a lateral position S1 and S2 or an inverted position K, no fuel flows out into the open air or into the activated-carbon filter 6.

Figure 2:
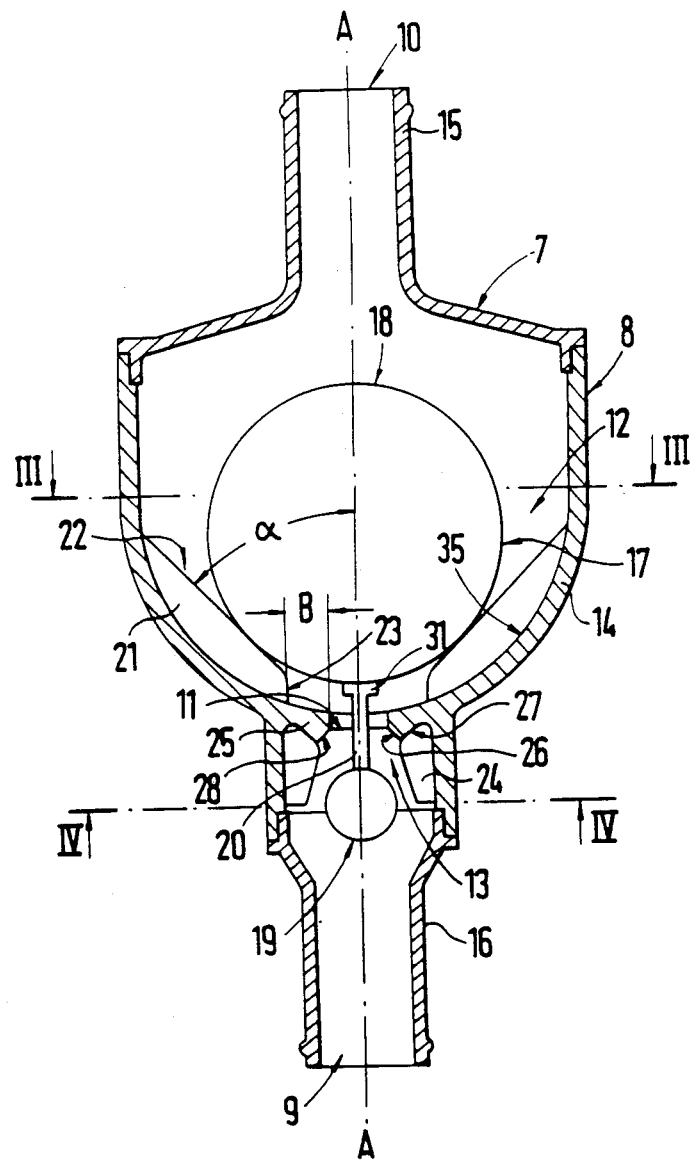
FIG. 2 is an enlarged sectional detail X of FIG. 1.
Figure 4:
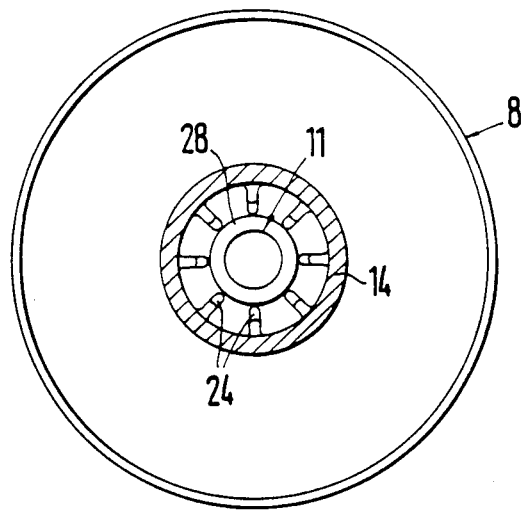
FIG. 4 is a sectional view taken along Line IV—IV of FIG. 2.

The closing arrangement 7 comprises a housing 8 at which an inlet 9, an outlet 10 as well as an outlet opening 11 are provided (FIG. 2). The outlet opening 11 is arranged in the connecting area of two chambers 12, 13 of the housing 8 that are located above one another and extends approximately in a center area between the inlet 9 and the outlet 10.

The housing 8, that is preferably made of a plastic material, is developed in several parts and, according to FIG. 2 consists of a center part 14, a top part 15 and a bottom part 16. The individual parts of the housing 8 are connected with one another, for example, by means of friction welding.

Figure 5:
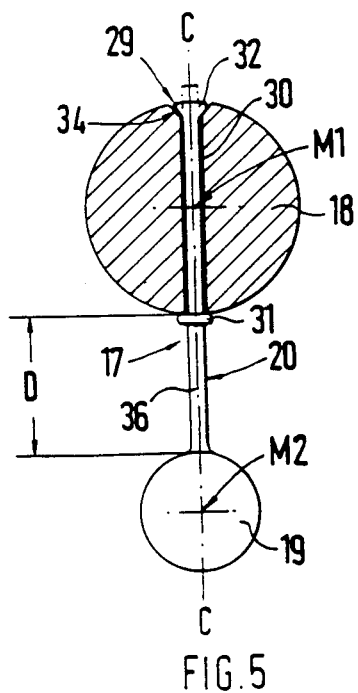
FIG. 5 is a sectional view of the closing device of the closing arrangement of FIGS. 1 through 4.

On the inside of the housing 8, a closing device 17 is arranged that consists of a mass part 18, a closing part 19 and a connecting element 20, the mass part 18 extending at a distance D from the closing part 19 (FIG. 5). The rod-shaped connecting element 20, at one of its ends, is firmly connected with the mass part 18 and, at its other end, with the closing part 19. The connecting element 20 penetrates the outlet opening 11 and, in sections, projects into both chambers 12, 13. The diameter of the connecting element 20 is significantly smaller than the diameter of the outlet opening 11. The mass part 18 is, to a certain extent in a freely movable way, arranged in the chamber 12 that faces the outlet 10, and the closing part 19 is, to a certain extent in a freely movable way, arranged in the chamber that is located below it. The chamber 12 that receives the mass part 18 has a significantly larger diameter and a larger volume than chamber 13. Adjacent to the outlet opening 11, the chamber 12 has a cup-shaped area 35, whereas the section of the chamber 12 that faces the outlet 10 is developed approximately cylindrically.

Figure 3:
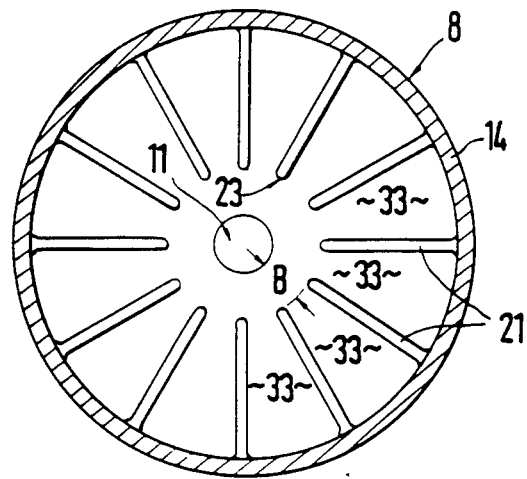
FIG. 3 is a sectional view taken along Line III—III of FIG. 2.

At the interior side of the chamber 14, in the cup-shaped area 35, adjacent to the outlet opening 11, several guiding ribs are arranged that are arranged in a star shape with respect to one another and on which the mass part 18 rests. An upper limiting edge 22 of the guiding ribs 21 is connected to the exterior housing wall and extends at an angle α with respect to a vertical plane A—A, in which case the angle α preferably amounts to 45°. End areas 23 of the guiding ribs 21 that face the vertical plane A—A extend approximately in parallel to this plane and, in top view, on an arc of a circle that has a larger diameter than the outlet opening 11 (see FIG. 3). The chamber 13 that receives the closing part 19 is developed to be approximately cylindrical, the inside diameter of this chamber being significantly smaller than the inside diameter of the chamber 12. On the inside of the chamber 13, the ribs 24 for the guiding of the closing part 19 are provided that are arranged in a star shape. The ribs 24 that extend from the housing wall to the inside, expand conically in upward direction, causing the space for the closing element 19 to taper conically in the direction of the outlet opening 11. Between the two chambers 12 and 13, a dividing wall 25 is provided that contains the outlet opening 11 and that is developed in a cup-shape on the side facing the mass part 18. In downward direction, the dividing wall 25 is composed of two sections 26, 27 that are fitted together at an angle, in which case the section 26 bordering on the outlet opening 11 forms a conical sealing surface 28 that is disposed in front of the outlet opening 11.

According to FIG. 2, the mass part 18 as well as the closing part 19 are developed to be spherical. However, embodiments are also contemplated where the mass part 18 and possibly also the closing part 19 are developed to be conical or the like. The mass part 18 is made of a material of a relatively high specific weight, for example, of rust-proof steel, whereas the closing part 19 is made of a light-weight material, such as a plastic material. The diameter of the mass part 18 is twice to five times, preferably about four times, as large as the diameter of the closing part 19.

The connecting element 20 is developed in one piece with the closing part 19 and, at its free end 29, receives the mass part 18. For this purpose, a through-bore 30 is provided at the mass part 18 through which the connecting element 20 is guided. The mass part 18, at the bottom, rests on a collar 31 of the connecting element 20 and at the top, has a cross-sectional expansion or crimping 32 of the connecting element 20 which, in a form-fitting way, interacts with a conical chamfering 34 of the mass part 18. A center line 36 of the connecting element 20 extends on an auxiliary plane C—C that connects the centers M1, M2 of the mass part 18 and of the closing part 19 with one another.

In the normal position N of the vehicle, the mass part 18 rests on the guiding ribs 21 of the chamber 12 that is located on top, and the fuel vapors, through the chamber 13 and the outlet opening 11, arrive in the flow-through ducts 33 extending between the guiding ribs 21. After passing through the flow-through ducts 33, the fuel vapors flow laterally past the mass part 18 in upward direction to the outlet 10 of the housing 8. Since the mass part 18 is developed to be relatively heavy, the closing part 19, also under extreme conditions (high outside temperature, altitude), cannot, as a result of intensified gasification of the fuel, be pressed upward against the sealing surface 28 of the outlet opening 11. In the case of an inclined position S1 or S2 or an inverted Position K of the vehicle, however, the closing Part 19, by the weight of the mass part 18, is pulled against the outlet opening 11 and closes it effectively so that no fuel can flow out into the open air or into the activated-carbon filter 6.

Although the present invention has been described and illustrated in detail, it is to be clearly understood that the same is by way of illustration and example only, and is not to be taken by way of limitation. The spirit and scope of the Present invention are to be limited only by the terms of the appended claims.

We claim:

1. A closing arrangement for a vent line of a fuel tank comprising:
   housing means with an inlet opening and an outlet opening;
   a first chamber and a second chamber formed in the housing means one above the other and connected to one another by a connecting opening, the first chamber having a cup-shaped area adjacent to the connection opening;
   a mass part disposed in the first chamber;
   a closing element disposed in the second chamber;
   several guiding ribs arranged in a star shape at the interior side of the cup-shaped area on which guiding ribs the mass part rests;
   and a connecting element connecting the mass part and the closing element, said connecting element penetrating the connecting opening and projecting into both chambers to hold the mass part and closing element for limited movement with the closing element closing the connecting opening only during an inclined fuel tank position.

2. A closing arrangement according to claim 1, wherein an upper limiting edge of the guiding ribs extends at an angle with respect to a vertical plane, the angle α preferably amounting to 45°.

3. A closing arrangement according to claim 2, wherein end areas of the guiding ribs that face the outlet connecting extend approximately parallel to a vertical axis and at a radial distance from the connecting opening.

4. A closing arrangement for a vent line of a fuel tank comprising:
   housing means with an inlet opening and an outlet opening;
   a first chamber and a second chamber formed in the housing means one above the other and connected to one another by a connecting opening, the second chamber being approximately cylindrical and having a significantly smaller diameter than the first chamber located above it;
   a mass part disposed in the first chamber;
   a closing element disposed in the second chamber;
   ribs for guiding of the closing element provided at the second chamber below the connecting opening, the ribs being arranged in a star shape;
   and a connecting element connecting the mass part and the closing element, said connecting element penetrating the connecting opening and projecting into both chambers to hold the mass part and closing element for limited movement with the closing element closing the connecting opening only during an inclined fuel tank position.

5. A closing arrangement according to claim 4, wherein the ribs coverage conically in upward direction toward a sealing surface that is located adjacent the connecting opening in the second chamber.

6. A closing arrangement for a vent line of a fuel tank comprising:

housing means with an inlet opening and an outlet opening, a first chamber and a second chamber formed in the housing means one above the other and connected to one another by a connecting opening.

a mass part disposed in the first chamber, a closing element disposed in the second chamber, and a connecting element connecting the mass part and the closing element, the connecting element penetrating the connecting opening and projecting into both chambers to hold the mass part and closing element for limited movement with the closing element closing the connecting opening only during an inclined fuel tank position, the mass part resting on a collar of the connecting element, and wherein a section of the connecting element is guided through a through-bore of the mass part and has a cross-sectional expansion at its free end that interacts with a chamfering of the mass part in a form-fitting way.

7. A closing arrangement according to claim 6, wherein the mass part is arranged in the first chamber that faces the outlet opening, and the closing part is arranged in the second chamber located below the first chamber.

8. A closing arrangement according to claim 6, wherein the connecting element is developed like a rod, one end of the connecting element being connected with the mass part, and the other end being connected with the closing part.

9. A closing arrangement according to claim 6, wherein the closing part, in the case of an inclined position or an inverted position of the fuel tank, is pulled against the connecting opening by the weight of the mass part.

10. A closing arrangement according to claim 6, wherein the first chamber, adjacent to the connecting opening, has a cup-shaped area.

11. A closing arrangement according to claim 6, wherein the second chamber that receives the closing element is developed approximately cylindrically and has a significantly smaller diameter than the first chamber located above it.

12. A closing arrangement according to claim 6, wherein the connecting opening is provided at a dividing wall arranged between the first and second chambers.

13. A closing arrangement according to claim 6, wherein the mass part as well as the closing element are developed to be spherical.

14. A closing arrangement according to claim 13, wherein the diameter of the mass part is twice to five times as large as the diameter of the closing element.

15. A closing arrangement according to claim 6, wherein the mass part is made of a material of a high specific weight.

16. A closing arrangement according to claim 6, wherein the closing element is made of plastic.

17. A closing arrangement according to claim 6, wherein the connecting element is developed in one piece with the closing element.

* * * * *